(12) United States Patent
Randolph

(10) Patent No.: US 12,209,445 B2
(45) Date of Patent: Jan. 28, 2025

(54) LIFT MECHANISM FOR VEHICLE HOODS

(71) Applicant: Curtis D Randolph, Pacoima, CA (US)

(72) Inventor: Curtis D Randolph, Pacoima, CA (US)

( * ) Notice: Subject to any disclaimer, the term of this patent is extended or adjusted under 35 U.S.C. 154(b) by 0 days.

(21) Appl. No.: 17/323,026

(22) Filed: May 18, 2021

(65) Prior Publication Data

US 2022/0372805 A1    Nov. 24, 2022

(51) Int. Cl.
*E05D 3/16*    (2006.01)
*B62D 25/12*    (2006.01)

(52) U.S. Cl.
CPC .............. *E05D 3/16* (2013.01); *B62D 25/12* (2013.01); *E05D 2003/163* (2013.01); *E05Y 2201/624* (2013.01); *E05Y 2900/536* (2013.01)

(58) Field of Classification Search
CPC ..... E05D 3/16; E05D 2003/163; B62D 25/12; E05Y 2201/624; E05Y 2900/536; B60R 21/38
USPC ..................................... 296/193.11
See application file for complete search history.

(56) References Cited

U.S. PATENT DOCUMENTS

| | | | | |
|---|---|---|---|---|
| 7,182,191 B2 * | 2/2007 | Scott | ............ | B60R 21/34 |
| | | | | 188/372 |
| 7,931,111 B2 * | 4/2011 | Kim | ............ | B60R 21/38 |
| | | | | 296/193.11 |
| 10,717,471 B2 * | 7/2020 | Glickman | ............ | B60Q 3/30 |
| 2015/0176315 A1 * | 6/2015 | Labbe | ............ | E05D 3/02 |
| | | | | 296/193.11 |
| 2018/0056927 A1 * | 3/2018 | Yamada | ............ | E05D 3/125 |
| 2018/0057068 A1 * | 3/2018 | Leschnik | ............ | B62D 25/12 |
| 2021/0197758 A1 * | 7/2021 | Hishon | ............ | B60R 21/38 |

FOREIGN PATENT DOCUMENTS

| | | | | |
|---|---|---|---|---|
| CN | 114734950 A | * | 7/2022 | |
| EP | 2495140 A1 | * | 9/2012 | ............ B60R 21/38 |

* cited by examiner

*Primary Examiner* — Pinel E Romain
(74) *Attorney, Agent, or Firm* — Andrew S. Rapacke; The Rapacke Law Group, P.A.

(57) ABSTRACT

A vehicle hood lift mechanism is disclosed, including a central member extending between a vehicle and a hood. The central member is pivotally engaged with the hood via a first hinge. A central portion is pivotally engaged via a second hinge to the central member. The central portion includes a lower and upper member each joined at the second hinge. The lower member includes a distal end pivotally engaged to a lower member via a third hinge and the upper member includes a distal end pivotally engage to a second arm via a fourth hinge. The first arm extends between the distal end of the lower member to the hood and the second arm extends between the distal end of the upper member and the engine compartment. The vehicle hood lift mechanism allows the hood to be maintained in a horizontal plane when in a raised and lowered position.

20 Claims, 5 Drawing Sheets

LIFT MECHANISM FOR VEHICLE HOODS

TECHNICAL FIELD

The embodiments relate to mechanisms which aid in lifting and lowering the hood of a vehicle between an open and closed (e.g., raised and lowered) position.

BACKGROUND

Vehicles often include a hood which is assembled as a hinged cover over the engine compartment. Hoods can open to allow access to the engine compartment during maintenance and repair of the vehicle's components contained within the engine compartment. In most front-engine vehicles, the hood is hinged at the front or rear edge interface between the hood and engine compartment. The hood can be retained in an open position by a hood support member or by actuators. Once closed, the hood is retained in the closed position by an interior hood latch or by hood pins.

The orientation of the hinge of the hood can hinder the ability of a mechanic or vehicle owner to sufficiently access the engine components. Often, the hood may block sufficient access to certain components, and may be required to be removed for particular engine service protocols. Further, the opened hood may block the communication between persons outside the vehicle with those inside the vehicle.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments disclosed herein provide a vehicle hood lift mechanism, including a central member extending between a vehicle and a hood. The central member is pivotally engaged with the hood via a first hinge. A central portion is pivotally engaged via a second hinge to the central member. The central portion includes a lower and upper member each joined at the second hinge. The lower member includes a distal end pivotally engaged to a first arm via a third hinge and the upper member includes a distal end pivotally engage to a second arm via a fourth hinge. The first arm extends between the distal end of the left arm to the hood and the second arm extends between the distal end of the right arm and the engine compartment. The vehicle hood lift mechanism allows the hood to be maintained in a horizontal plane when in a raised and lowered position.

The vehicle hood lift mechanism allows the entire hood to raise and lower to allow full access to the engine compartment and vehicle components therein. In such, the hood lift mechanism of the present embodiments permits the hood to maintain a horizontal plane while the hood is raised and lowered to provide enhance safety and access to the engine compartment as well as permit communication between persons inside and outside the vehicle.

In one aspect, the vehicle hood lift mechanism includes at least one actuator to facilitate opening and closing of the hood. The actuator may be electrically, pneumatically, hydraulically, or human powered.

In one aspect, the vehicle hood lift mechanism includes a hood attachment member positioned between the central member and the hood.

In one aspect, the hood attachment member is pivotally engaged to the central member via the first hinge. The hood attachment member is pivotally engaged with the first arm via a fifth hinge.

In one aspect, the hood attachment mechanism is permanently affixed to the hood.

In one aspect, the second arm is pivotally engaged with the engine compartment via a seventh hinge.

In one aspect, the first arm is pivotally engaged with the hood via a fifth hinge.

In one aspect, the central member is comprised of a plurality of apertures.

In one aspect, the plurality of apertures permits the selective engagement of the central portion.

In one aspect, the first hinge is engaged with at least one of the plurality of apertures.

In one aspect, the central member is cut to facilitate vehicles of various sizes and configurations.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
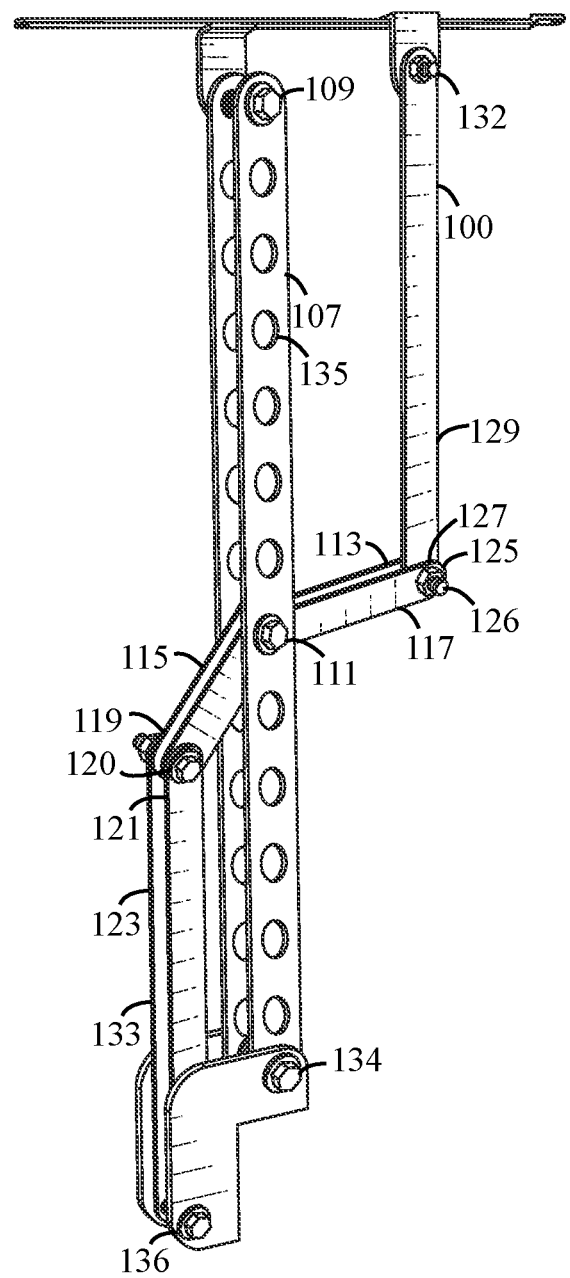
FIG. 1 illustrates a perspective view of the vehicle hood lift mechanism in an extended configuration, according to some embodiments.

The specific details of the single embodiment or variety of embodiments described herein are to the described system. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the systems. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second" and the like, may be used solely to distinguish one entity or element from another entity or element without necessarily requiring or implying any physical or logical relationship, or order between such entities or elements.

In general, the embodiments provided herein relate to a vehicle hood lift mechanism which allows a user to open and close the hood of a vehicle. Vehicle hood lift mechanism in the current arts allow the hood to pivot about a hinge mechanism positioned at the front or rear end of the hood resulting in either the front end or read end of the hood to raise and lower while the opposing end is retained near the pivot axis. The present embodiments described a hood lift mechanism which allows the entire hood to raise and lower to allow full access to the engine compartment and vehicle components therein. In such, the hood lift mechanism of the present embodiments permits the hood to maintain a horizontal plane while the hood is raised and lowered.

As used herein, the term vehicle may relate to consumer or commercial vehicles (e.g., cars, trucks, sport-utility vehicles, crossovers, vans, freightliners, etc.) as well as modified and customized vehicles including show vehicles and race vehicles. One skilled in the arts will readily understand that the lift mechanism described herein may be readily modified to be used in various vehicle sizes and configurations.

FIG. 1 illustrates a perspective view of the vehicle hood lift mechanism 100 in an extended configuration which in use is positioned between the hood and engine compartment of the vehicle. The vehicle hood lift mechanism 100 comprises a central member 107 extending vertically from the engine compartment attachment point to the hood. The central member 107 is pivotally engaged to the hood via a first hinge 109 to allow the hood to maintain a horizontal plane while being lifted and lowered between the raised and lowered positions. A second hinge 111 is provided along the central member 107 to pivotally engage with a central portion 113 of the vehicle hood lift mechanism. The central portion 113 includes a lower member 115 and an upper member 117 joined at the second hinge 111 to allow the angle therebetween to be increased or decreased during the lifting and lowering of the hood. The distal end 119 of the lower member 115 is pivotally engaged via a third hinge 120 with the top end 121 of a first arm 123 while the distal end 125 of the upper member 117 is pivotally engaged via a fourth hinge 126 with the bottom end 127 of the second arm 129. The second arm 129 extends between the distal end 125 of the upper member 117 and the hood such that the attachment point is most near the rear edge 131 of the hood compared to the attachment point of the central member 107 to the hood. A fifth hinge 132 connects the second arm 129 to the hood. The first arm 123 extends between the distal end 119 of the lower member 115 to the engine compartment attachment point which is near most the forward edge of the engine compartment compared to the central member 107 attachment point. A sixth hinge 134 connects the central member 107 to the engine compartment, while a seventh hinge 136 connects the first arm 123 to the engine compartment.

In further reference to FIG. 1, the hood lift mechanism 100 may include one or more actuators 133 which facilitate the opening and closing (i.e., the raising and lowering) of the hood. The actuators 133 may extend between the engine compartment and the distal end 125 of the upper member 117 to extend or contract the distance therebetween when opening or closing (i.e., raising and lowering) the hood. In an alternative embodiment, the actuator 133 may be positioned between the hood and the distal end 119 of the lower member 115.

The actuators 133 may include electric-powered actuators, pneumatic actuators, hydraulic actuators, or human-powered actuators known in the arts. The actuator 133 is operated via a control signal to supply a power input to the actuator 133, wherein the control signal is electric, pneumatic pressure, hydraulic fluid pressure, or human input. In such, the actuator 133 applies force to at least one component of the vehicle hood lift mechanism 100 (e.g., applying a force between the engine compartment and the upper member 117) to facilitate opening and/or closing of the hood.

From the foregoing, it will be seen that the present embodiments provides an actuator which is simple, provides a wide selection of speed and power choices, and which has the capability to extend to several times its original length. This allows for compact storage within the engine compartment.

In some embodiments, the central member 107 includes a plurality of apertures 135 to engage with the first hinge 109. The apertures 135 are spaced along the length of the central member 107 to allow for the orientation of the vehicle hood lift mechanism 100 to be changed by changing the position of the lower and upper members 115, 117.

In some embodiments, the attachment points between the components of the vehicle hood lift mechanism 100 and the engine compartment and/or the hood may be permanently affixed attachments (e.g., via welding, integral molding, etc.) or by a releasable engagement (e.g., by nuts and bolts, riveting, clips, etc.). The releasable engagement may allow for the hood to be readily removed during maintenance or service of the vehicle. In an alternative embodiment, the hood may be attached via a hood attachment member as illustrated in FIG. 3.

Figure 2:
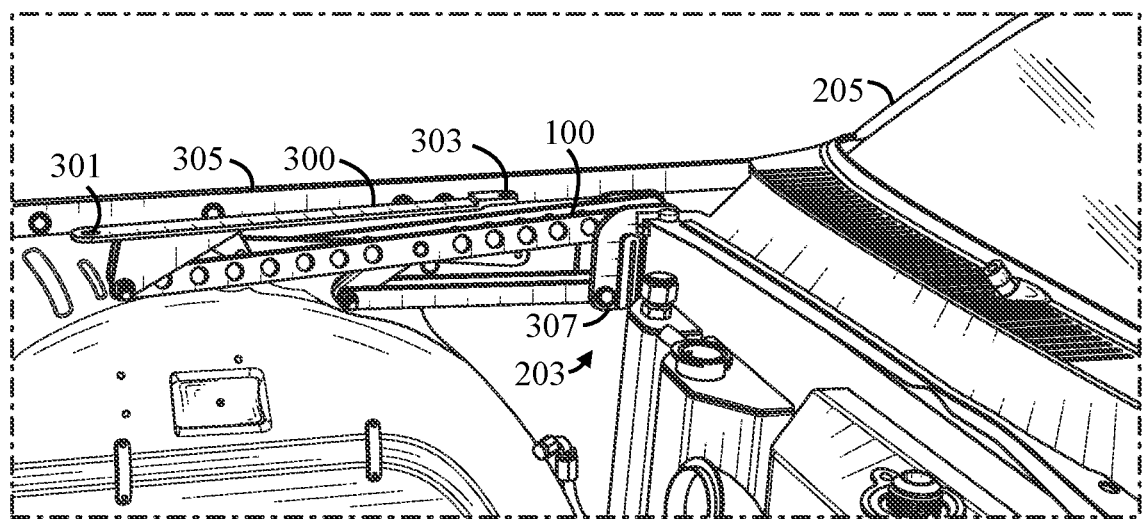
FIG. 2 illustrates a perspective view of the vehicle hood lift mechanism in a contracted configuration while positioned between the hood and engine compartment of the vehicle, according to some embodiments.
Figure 3:
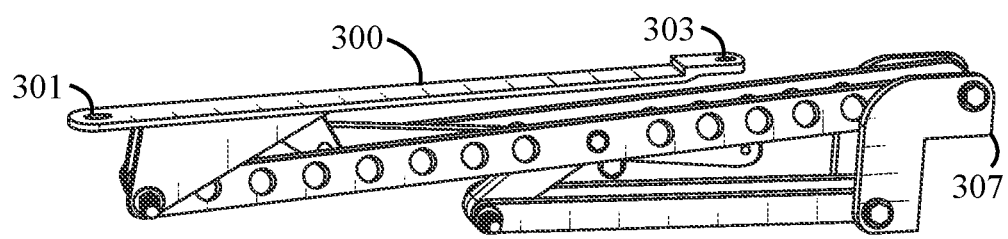
FIG. 3 illustrates a perspective view of the vehicle hood lift mechanism in a contracted position, according to some embodiments.

FIG. 2 and FIG. 3 illustrate a perspective view of the vehicle hood lift mechanism 100 in the contracted position within the engine compartment 203 of the vehicle 205. It is noted that the vehicle 205 and engine compartment 203 are specifically illustrated in FIG. 2. FIG. 3 illustrates the vehicle hood lift mechanism 100 isolated from the vehicle. The hood is attached via a hood attachment member 300 provides forward and rearward receivers 301, 303 which receive attachment means (e.g., bolts) to releasably engage with the hood. Alternatively, the hood attachment member 300 may be permanently affixed via welding or similar attachment means. The hood attachment member 300 is maintained in a horizontal plane while lifting and lowering the hood to allow the hood to rest along the top edge 305 (see FIG. 2) of the engine compartment when in a closed position. The vehicle hood lift mechanism attached to the engine compartment via interface 307. The interface 307 may be a welded connection, bolted connection, or other attachment means known in the arts.

In some embodiments, the interface 307 may be adapted to attach to various components within the engine compartment and/or the frame of the vehicle.

Figure 4:
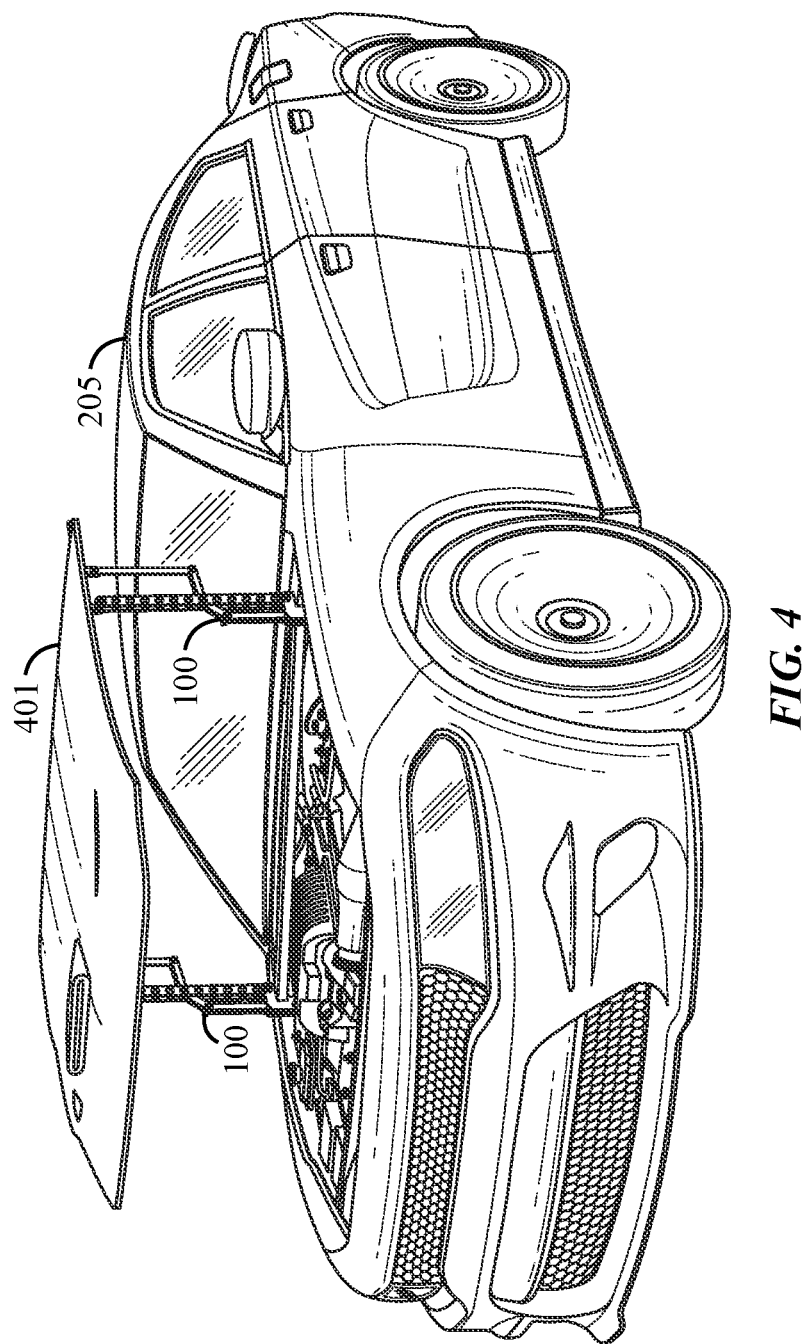
FIG. 4 illustrates a perspective view of the vehicle having the hood in a raised position wherein the vehicle hood lift mechanism is in an extended position, according to some embodiments.

FIG. 4 illustrates a perspective view of the vehicle 205 having the hood 401 in a raised position wherein the vehicle hood lift mechanism 100 is in an extended position to raise the hood 100 while retaining the hood in a horizontal plane. A lock mechanism provided with the vehicle hood lift mechanism 100 to ensure the hood 401 is retained in the raised position. The lock mechanism provides a safety feature to prevent the hood 401 from falling on a user underneath the hood 101. The vehicle hood lift mechanism 100 may be positioned on each side of the vehicle's engine compartment, such that each side of the hood 401 is supported.

Figure 5:
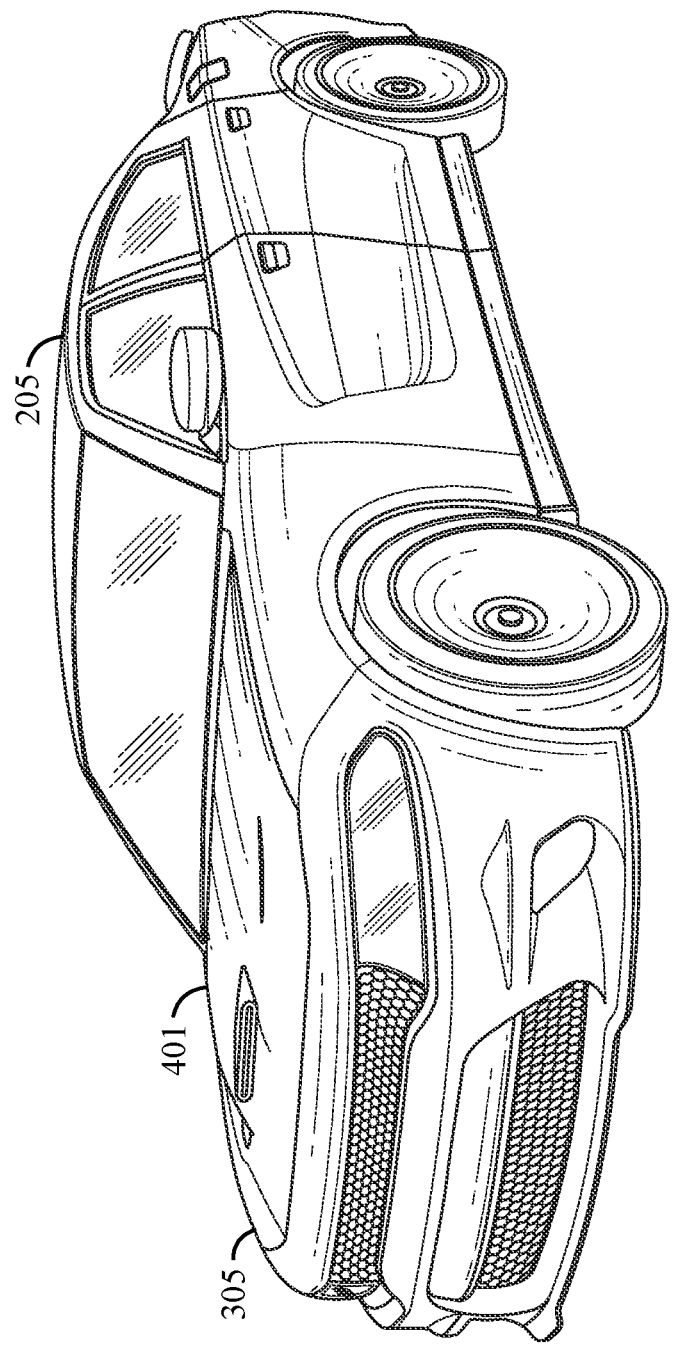
FIG. 5 illustrates a perspective view of the vehicle having the hood in a lowered position wherein the vehicle hood lift mechanism is in a contracted position, according to some embodiments.

FIG. 5 illustrates a perspective view of the vehicle 205 having the hood 401 in a lowered position wherein the vehicle hood lift mechanism is in a contracted position (as shown in FIG. 2 and FIG. 3) to lower the hood 401 when driving or storing the vehicle 205. The contracted position allows the hood 401 to rest in a flush alignment with the top edge 305 of the engine compartment. The locking mechanism may provide a means for retaining the hood 401 in the closed position to prevent the hood 401 from being unintentionally or inadvertently raised.

Figure 6:
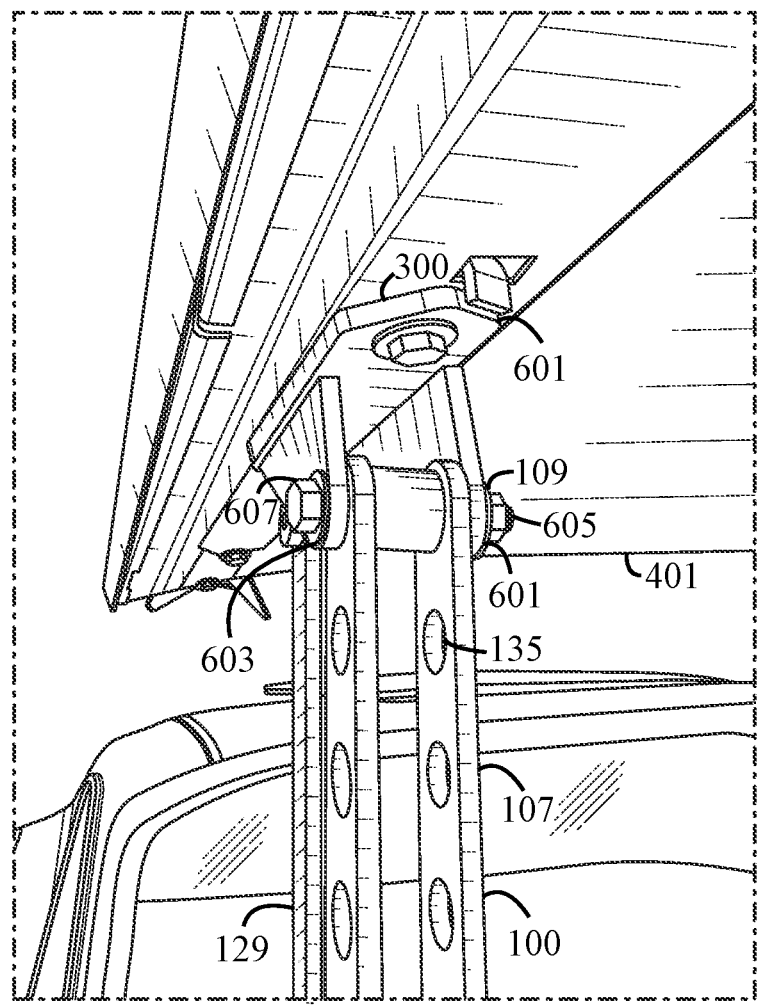
FIG. 6 illustrates a perspective view of the attachment mechanism to attach the vehicle hood lift mechanism to the hood of the vehicle and/or to the engine compartment, according to some embodiments.

FIG. 6 illustrates a perspective view of the attachment mechanism 600 to attach the vehicle hood lift mechanism 100 to the hood 401 of the vehicle. The attachment mechanism includes the hood attachment member 300 pivotally engage with the central member 107 via the first hinge 109. The first hinge 109 includes first and second receivers 601, 603 to receive a bolt 605 retained via a nut 607. The second arm 129 similarly pivotally engages with the hood attachment member 300 via the fifth hinge. The first hinge 109 is retained in positioned by one of the apertures 135 positioned on the central member 107.

In some embodiments, the length of the central member 107 may be cut to size to allow the vehicle hood lift mechanism 100 to be readily deployed in various vehicle sizes and configurations.

Figure 7:
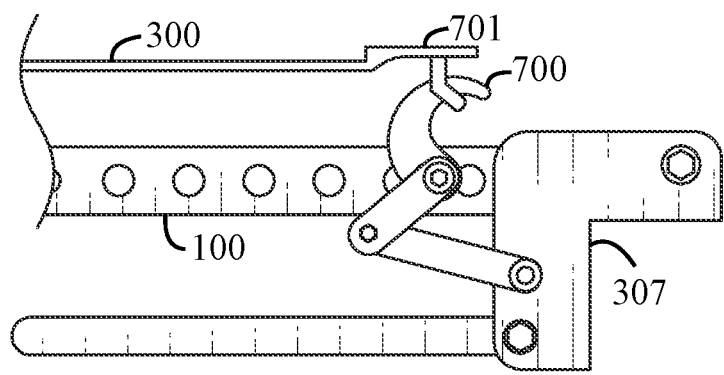
FIG. 7 illustrates a side elevation view of the locking mechanism, according to some embodiments.

FIG. 7 illustrates a side elevation view of the locking mechanism 700 positioned between the interface 307 and hood attachment member 300. The locking mechanism 700 retains the hood lifting mechanism 100 in the closed positioned by releasably engaging with a post 701 positioned on the hood attachment member 300. In such, a user can selectively open and close the hood by operating the locking mechanism release.

One skilled in the arts will readily understand that while the embodiments described herein relate to a vehicle hood lift mechanism for front-engine vehicles, the embodiments may be readily applied to rear-engine and mid-engine vehicles such that the engine cover is raised and lowered while retaining the engine cover in a horizontal plane.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A vehicle hood lift mechanism, comprising:
a central member extending between a vehicle and a hood, the central member pivotally engaged with the hood via a first hinge;
a central portion pivotally engage via a second hinge to the central member, the central portion comprising a lower member and a right member each joined at the second hinge, the lower member including a distal end pivotally engaged to a first arm via a third hinge, the right arm including a distal end pivotally engaged to a second arm via a fourth hinge, the second arm extending between the distal end of the lower member to the hood, and the first arm extending between the distal end of the right arm and an engine compartment.

2. The vehicle hood lift mechanism of claim 1, further comprising a hood attachment member positioned between the central member and the hood.

3. The vehicle hood lift mechanism of claim 2, wherein the hood attachment member is pivotally engaged to the central member via the first hinge and wherein the hood attachment member is pivotally engaged with the second arm via a fifth hinge.

4. The vehicle hood lift mechanism of claim 3, wherein the hood attachment mechanism is permanently affixed to the hood.

5. The vehicle hood lift mechanism of claim 1, wherein the first arm is pivotally engaged with the engine compartment via a seventh hinge.

6. The vehicle hood lift mechanism of claim 1, wherein the second arm is pivotally engaged with the hood via a fifth hinge.

7. The vehicle hood lift mechanism of claim 1, wherein the central member is comprised of a plurality of apertures.

8. The vehicle hood lift mechanism of claim 1, wherein the plurality of apertures permits for a selective engagement of the central portion.

9. The vehicle hood lift mechanism of claim 1, wherein the first hinge is engaged with at least one of a plurality of apertures.

10. The vehicle hood lift mechanism of claim 1, wherein the central member is cut to facilitate vehicles of various sizes.

11. A vehicle hood lift mechanism, comprising:
a central member extending between a vehicle and a hood, the central member pivotally engaged with the hood via a first hinge;
a central portion pivotally engage via a second hinge to the central member, the central portion comprising a lower member and a right arm each joined at the second hinge, the lower member including a distal end pivotally engaged to a first arm via a third hinge, the right arm including a distal end pivotally engaged to a second arm via a fourth hinge, the second arm extending between the distal end of the lower member to the hood, and the first arm extending between the distal end of the right arm and an engine compartment, wherein the hood is maintained in a horizontal plane when in a raised position and a lowered position.

12. The vehicle hood lift mechanism of claim 11, further comprising a hood attachment member positioned between the central member and the hood.

13. The vehicle hood lift mechanism of claim 12, wherein the hood attachment member is pivotally engaged to the central member via the first hinge and wherein the hood attachment member is pivotally engaged with the second arm via a fifth hinge.

14. The vehicle hood lift mechanism of claim 13, wherein a hood attachment mechanism is permanently affixed to the hood.

15. The vehicle hood lift mechanism of claim 14, wherein the first arm is pivotally engaged with the engine compartment via a seventh hinge.

16. The vehicle hood lift mechanism of claim 15, wherein the second arm is pivotally engaged with the hood via the fifth hinge.

17. The vehicle hood lift mechanism of claim 16, wherein the central member is comprised of a plurality of apertures, wherein the plurality of apertures permits for a selective engagement of the central portion.

18. The vehicle hood lift mechanism of claim 17, wherein the first hinge is engaged with at least one of the plurality of apertures.

19. The vehicle hood lift mechanism of claim 18, further comprising a locking mechanism to retain the hood in the raised position and the lowered position.

20. A vehicle hood lift mechanism, comprising: a central member extending between a vehicle and a hood, the central member pivotally engaged with the hood via a first hinge; a central portion pivotally engage via a second hinge to the central member, the central portion comprising a lower member and a right arm each joined at the second hinge, the lower member including a distal end pivotally engaged to a first arm via a third hinge, the right arm including a distal end pivotally engage to a second arm via a fourth hinge, the first arm extending between the distal end of the lower member to the engine compartment, and the second arm extending between the distal end of the right arm and the hood; and at least one actuator positioned between the engine compartment and the right arm, wherein the at least one actuator applies a force to facilitate the raising and lowering of the hood, wherein the hood is maintained in a horizontal plane when in a raised position and a lowered position.

* * * * *